July 30, 1929.  E. SCHNETZLER  1,722,768
THERMAL RELAY
Filed Aug. 22, 1927
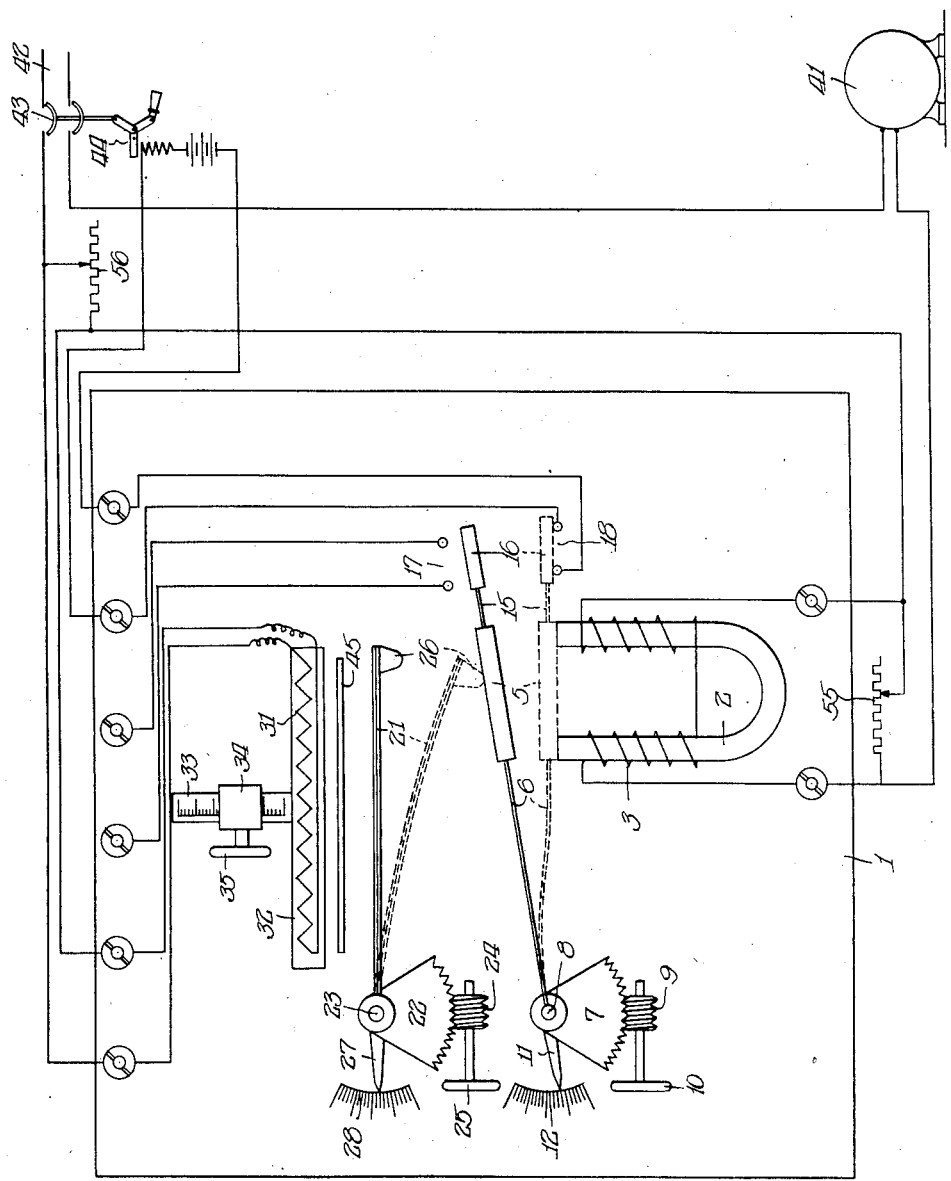
Witness:
R. Burkhardt
Inventor:
Eberhard Schnetzler,
By Cromwell, Greist & Warden
attys.

Patented July 30, 1929.

1,722,768

UNITED STATES PATENT OFFICE.

EBERHARD SCHNETZLER, OF HANAN-ON-THE-MAIN, GERMANY, ASSIGNOR TO AKTIEN-GESELLSCHAFT BROWN, BOVERI & CIE., OF BADEN, SWITZERLAND, A JOINT-STOCK COMPANY OF SWITZERLAND.

THERMAL RELAY.

Application filed August 22, 1927, Serial No. 214,516, and in Germany July 22, 1926.

This invention relates to thermal relays and devices of a similar character and it has, among its objects, improvements in such devices for permitting determinable adjustment of the operating characteristics thereof in accordance with the characteristics of the apparatus with which the same is to be associated. The objects of the invention and the novel features thereof will best appear from the following description of exemplification thereof, reference being had to the accompanying drawing showing diagrammatically an arrangement of the elements of a relay device embodying the invention.

Thermal relays and devices of a similar character used in association with electrical apparatus are ordinarily required to control an electrical operating circuit, by closing or opening the same, or to perform a mechanical control operation, in accordance with some function of current and time. In special cases the time is again a function of the varying temperature of a given body, for instance, the winding of a motor that is to be protected against overheating. In many of the cases, the tripping or actuation of such relays is effected by utilizing the heat expansion or a change in conductivity of some body, in respect to the variations of the temperature. One of the problems arising in the practical construction and application of such relays results from the fact that for reasons of economy, ready replacement of faulty units, efficiency, and reliability of service, it is desired to use one particular type of thermal relay device in connection with a variety of different thermal control operations and with different apparatus having, in many respects, radically distinct thermal characteristics. In each of the various applications the relay is required to operate in a particular manner peculiar to the particular thermal and operating characteristics of the associated apparatus. For instance, when used for protecting motors from overload, the relays must also permit the motor to be utilized to its utmost limit. When current fluctuations occur in the motor, the relay must, in its thermal characteristics, behave exactly like the motor and should disconnect the latter only when a predetermined limiting temperature is exceeded.

It is readily seen that the load characteristics of the motor during starting and running, its heat capacity, cooling characteristics, etc., will vary enormously for different motors. Furthermore, some owners or operators may give preference to a high degree of protection while another may desire to sacrifice the degree of protection and prefer better utilization of the apparatus. Thermal relay devices as constructed heretofore provided inadequate means in meeting the various peculiar problems and conditions under which they were required to operate, in that they lacked elements whereby the characteristics thereof could be positively adjusted or varied to meet the particular conditions.

These difficulties are overcome by the relay device of the present invention which is arranged for uniform adjustment of its thermal and operating characteristics to permit its adaption to various kinds of service and with various kinds of apparatus by a simple adjustment or change in a predetermined manner of the relationship of the elements thereof. In the relay device according to the invention, an electro-magnet is combined with a thermostatic or bi-metal element in such way that the free end of the latter, which moves to and fro under the influence of the varying temperature, controls the displacement of a movably mounted armature into the range of attraction of the electro-magnet. The individual elements of the device are arranged to permit adjustment and control of the cooperative relationship thereof and means are provided for additional control of the thermal capacity and characteristics of the whole unit.

The arrangement of the elements of the new relay device appears clear from the accompanying drawing. Mounted within a casing 1 is an electro-magnet 2 having a U-shaped soft iron core body with an exciting coil 3 mounted on the legs thereof. Disposed in front of the ends of the core legs of the magnet 2 is an armature 5 carried by a leaf spring 6, which is fixed to a support in the form of a toothed segment 7 that is pivotally mounted on a shaft 8 and arranged to be adjustably positioned by means of a screw 9 that may be rotated by a head 10. A pointer 11 extending from the segment 7 cooperates with a graduated scale 12 to indicate and locate the various angular positions of the supporting segment 7 to permit determinable adjustment of the relationship between the magnet 2 and the armature 5 through variation of the spacing therebetween or change of the tension of the spring 6 in case the armature 5 is acted upon by some other element, as will be explained hereinafter. The armature 5 has also an extending arm 15 carrying a contact bar 16 cooperating with a pair of front contacts 17 and a pair of back contacts 18 for closing or opening control circuits of the apparatus associated with the relay device and adapted to control, for instance, the tripping or closing coils of a circuit breaker. By turning the adjusting screw 9, the segment 7 may be rotated and held in any desired position, thereby determining the cooperative relation between the electro-magnet 2 and the armature 5.

The armature 5 is arranged to cooperate with a thermostat element in the form of a bi-metallic strip 21 mounted above the armature and held, like the latter, on a toothed segment 22 pivoted on a shaft 23 and arranged to be adjustably rotated and fixed by means of a screw spindle 24 that may be turned by a spindle-head 25. The free end of the bi-metallic strip 21 is provided with a tip 26 adapted to engage the upper surface of the armature 5 when said strip bends downwardly under the action of heat conveyed thereto. By turning the adjusting screw 24, the position of the thermostat segment 22 may be adjustably fixed, a pointer 27 cooperating with the scale 28, serving to locate and set its position. The cooperative relationship between the thermostat element 21 and the magneto armature 5, may thus be readily controlled.

Adjacent to the bi-metallic strip 21, there is mounted an electric heater element 31 on a suitable support 32 which is held on a graduated rod 33, the latter being slidably mounted within a perforation in a supporting post 34 and arranged to be locked in any of the positions indicated on the scale as by means of a locking screw 35. By raising or lifting the heater 31, the spacing thereof with respect to the bi-metallic element 21 may be readily changed and the response of the latter to the heat element varied, the cooperative relationship of said two elements being readily determined and fixed from the readings on the scale of the heater-supporting rod 33 and the thermostat-support scale 28. In the same way, the cooperative relationship of the action of the electromagnet 2, the armature 5 and the bi-metallic strip 21 may be determined from the readings on the armature-support scale 12 and the scale 28 of the thermostat support.

The drawing also shows an example of the connections of the relay device when used in connection with the protection of a motor as indicated at 41. The motor is arranged to be supplied from a power line 42 through a circuit breaker 43, the circuit breaker having a tripping coil 44 for disconnecting the motor from the line. In order to protect the motor 41 against overheating, the relay device described above has its heater coil 31 connected in series with the exciting coil 3 of the electro-magnet 2 in one of the leads from the circuit breaker 43 to the motor 41, the heat input into the relay through the heater coil 31 and the excitation of the electro-magnet 2 being proportional to the current flowing into the motor. Under the action of the heat emanating from the heater 31, the bi-metallic strip 21 will bend downwardly, as indicated. In its downward movement the tip 26 of the strip 21 will come into action against the armature 5, pushing the armature 5 towards the poles of the electro-magnet 2, against the action of the spring 6. Depending on the adjustments of the positions of the segments 7, 22 and of the heater 31, and the current flow conditions to the motor 41, there will be a certain pre-determined value for the input to the motor 41 which, when exceeded, will cause the strip 21 to bring the armature 5 so far towards the poles of the electro-magnet 2 that the armature will be attracted downwardly, suddenly opening the front contacts 17 and closing the back control contacts 18, thereby tripping the circuit breaker 43 and disconnecting the motor 41 from the line. The heat from the heater 31 may be conveyed to the bi-metallic strip either directly by conduction or indirectly by radiation and convection, or by all three ways, simultaneously. If all the elements are placed in an evacuated place, the transfer of heat would take place by radiation only, if in a gaseous medium, both radiation and convection come into play and, to a smaller extent, conduction. The same holds for oil or other mediums. The heating element may be arranged so that it is in direct contact with the bi-metal strip 21 and the heat exchanged therewith may be changed by varying the contact area. The rate of transfer of heat may also be varied by inserting a partition between the heating element and the strip as indicated at 45, the latter being so arranged as to permit variation of the depth of the heater covered thereby.

In the preferred arrangement, the casing inclosing the operating elements is filled with oil. In this way the switching operations performed by the contact bar 16 and the contacts 17 and 18 are carried out under oil, greatly increasing the current capable of being handled in the control circuits. By using oils of different properties, the heat capacity of the relay may be readily varied.

In the preferred arrangement the material of the heating wire in the heater 31 and the material of the electro-magnet coil 3 are arranged to have different thermal coefficients of conductivity, which, in conjunction with the other elements of adjustability, permits imparting to the relay a wide range of special characteristics suitable for cooperation with a great variety of different apparatus under many different operating conditions. The relay characteristics and operations thereof may be given additional characteristics by providing adjustable resistors 55, 56 in conjunction with the solenoid exciting coil 57 and the heater coil 31 to permit adjustment of the current flow therein, it being possible to entirely cut out said resistors or use the same to a more or less degree as desired. In the specific example shown in the drawings, the heater coil 31 and the magnet coil 5 are shown connected in series and traversed by the same current. However, in many applications, depending on the particular operating conditions and the desired characteristics of the relay, one of the elements may be connected to one portion of the circuit and the other of the elements may be connected to another portion of the circuit responding to different operating quantities thereof.

The invention is susceptible of many other modifications that will suggest themselves to those skilled in the art. It is accordingly desired that the appended claims be given a broad construction commensurate with the scope of the invention within the art.

I claim:

1. In a device of the class described, a magnet, an armature actuated by said magnet, biasing means for said armature to counteract the action of said magnet, a heater element, a thermostat element actuated by said heater element, biasing means for said thermostat element counteracting only the action of said heater element, said thermostat element being operable upon operating action thereof to impart movement to said armature toward said magnet against the opposing action of said first-named biasing means, and means for positively adjusting the cooperative relationship of said heater element and said thermostat element.

2. In a thermal relay device, an electro-magnet having an exciting coil, an armature actuated by said electro-magnet, positively adjustable biasing means for said armature opposing the action of said magnet thereon, an electric resistance heater, a thermostat element actuated by said heater, and positively adjustable biasing means for said thermostat element counteracting only the action of the heater thereon, said thermostat element being operable in response to the heat input to said heater to influence operating action of said electro-magnet with respect to said armature.

3. In a thermal relay device, an electro-magnet having an exciting coil, an armature actuated by said electro-magnet, positively adjustable biasing means for said armature opposing the action of said magnet thereon, an electric resistance heater, a thermostat element actuated by said heater, positively adjustable biasing means for said thermostat element counteracting the action of the heater thereon, said thermostat element and said armature cooperating to vary the resultant force acting on said armature in response to the heat input in said heater, and means for positively adjusting the heat flow conditions between said heater and said thermostat element.

In testimony whereof I have hereunto subscribed my name this 1st day of July A. D., 1927, at Frankfort-on-the-Main, Germany.

EBERHARD SCHNETZLER.